(12) United States Patent
Sasaki et al.

(10) Patent No.: US 9,253,307 B2
(45) Date of Patent: *Feb. 2, 2016

(54) MOBILE TERMINAL RECEIVING A TELEVISION BROADCAST SIGNAL BY CALCULATING A BEST AZIMUTH DIRECTION

(71) Applicant: NTT DOCOMO, INC., Chiyoda-ku (JP)

(72) Inventors: Makoto Sasaki, Chiyoda-ku (JP); Hiroki Shikama, Chiyoda-ku (JP); Takeshi Higuchi, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 27 days.

This patent is subject to a terminal disclaimer.

(21) Appl. No.: 14/345,141

(22) PCT Filed: Nov. 8, 2012

(86) PCT No.: PCT/JP2012/079035
§ 371 (c)(1),
(2) Date: Mar. 14, 2014

(87) PCT Pub. No.: WO2013/077197
PCT Pub. Date: May 30, 2013

(65) Prior Publication Data
US 2014/0349715 A1    Nov. 27, 2014

(30) Foreign Application Priority Data
Nov. 24, 2011    (JP) ................. 2011-256421

(51) Int. Cl.
*H04M 1/00* (2006.01)
*H04M 1/725* (2006.01)
*H04N 21/414* (2011.01)
*H04N 21/485* (2011.01)
*H04W 64/00* (2009.01)
*H04N 5/445* (2011.01)

(52) U.S. Cl.
CPC ..... *H04M 1/72572* (2013.01); *H04N 21/41407* (2013.01); *H04N 21/485* (2013.01); *H04W 64/006* (2013.01); *H04N 2005/44517* (2013.01); *H04N 2201/3253* (2013.01)

(58) Field of Classification Search
CPC ............ H04N 21/4126; H04N 21/422; H04N 21/4316; H04N 21/4524; H04N 21/478; H04N 2201/3253; H04N 2005/44517; H04N 21/41407; H04N 21/485; H04N 21/488; H04N 21/414; H04N 7/14; H04N 1/00095; H04N 21/6181; H04W 64/006; H04W 4/02; H04W 64/00; H04M 1/725; H04M 1/72572; H04M 1/0266; H04M 11/085; H04M 1/72533
See application file for complete search history.

(56) References Cited

U.S. PATENT DOCUMENTS

| | | | | |
|---|---|---|---|---|
| 2003/0013461 | A1* | 1/2003 | Mizune | H04M 1/72572 455/456.1 |
| 2004/0087294 | A1* | 5/2004 | Wang | 455/276.1 |
| 2004/0171391 | A1* | 9/2004 | Muramatsu | G01C 21/3629 455/456.6 |
| 2004/0214567 | A1* | 10/2004 | Yoon et al. | 455/423 |
| 2010/0251182 | A1* | 9/2010 | Komatsu | 715/834 |
| 2010/0323609 | A1* | 12/2010 | Aramaki | 455/3.01 |
| 2010/0324862 | A1* | 12/2010 | Sato | G01C 17/38 702/150 |
| 2011/0116453 | A1* | 5/2011 | Huang et al. | 370/329 |
| 2011/0274408 | A1* | 11/2011 | Hamada | G11B 20/00086 386/248 |
| 2011/0279310 | A1* | 11/2011 | Shibohta | G01S 19/36 342/357.25 |
| 2012/0040605 | A1* | 2/2012 | Morton | 455/3.06 |

FOREIGN PATENT DOCUMENTS

| | | | | |
|---|---|---|---|---|
| JP | 2006-311338 | * | 11/2006 | ............... H04B 1/16 |
| JP | 2006 311338 | | 11/2006 | |
| JP | 2008 028910 | | 2/2008 | |
| JP | 2008-099154 | * | 4/2008 | ............. H04N 5/445 |
| JP | 2008 99154 | | 4/2008 | |
| JP | 2009 239629 | | 10/2009 | |
| JP | 2009 303102 | | 12/2009 | |

OTHER PUBLICATIONS

International Search Report Issued Jan. 8, 2013 in PCT/JP12/079035 filed Nov. 8, 2012.
Office Action issued May 20, 2014, in Japanese Patent Application No. 2011-256421 with English translation.
Extended European Search Report issued Jun. 22, 2015 in Patent Application No. 12851538.4.

* cited by examiner

Primary Examiner — Meless Zewdu
(74) Attorney, Agent, or Firm — Oblon, McClelland, Maier & Neustadt, L.L.P.

(57) ABSTRACT

A mobile communication terminal including an antenna for receiving broadcasting waves of television broadcasting and being capable of detecting its own current location and an azimuth direction is provided, the mobile communication terminal including a broadcasting station location retaining unit configured to retain location information of a broadcasting station that transmits the broadcasting waves, a best azimuth direction calculating unit configured to, using the detected azimuth direction, calculate a best azimuth direction in which the mobile communication terminal can receive the broadcasting waves the best, an azimuth direction displaying unit configured to display a location of the broadcasting station and the best azimuth direction in the detected current location, and an azimuth direction display updating unit configured to update as needed the display by the azimuth direction displaying unit in accordance with a change of the azimuth direction of the mobile communication terminal.

6 Claims, 7 Drawing Sheets

MOBILE TERMINAL RECEIVING A TELEVISION BROADCAST SIGNAL BY CALCULATING A BEST AZIMUTH DIRECTION

TECHNICAL FIELD

The present invention relates to a mobile communication terminal, a mobile communication method, a mobile communication program and a recording medium.

BACKGROUND ART

In many cases, horizontal polarization waves are used for television broadcasting. In the case where a mobile communication terminal receives television broadcasting, in general a rod antenna is used. Therefore, the antenna gain pattern (directional characteristics) of horizontal polarization waves for a broadcasting wave arrival direction forms a figure of eight, and creates an easy-to-receive-broadcasting-wave direction and a not-easy-to-receive-broadcasting-wave direction. Also, an easy-to-receive-broadcasting-wave direction does not necessarily correspond to the front face direction of the mobile communication terminal due to an antenna structure, an antenna position, etc.

RELATED ART DOCUMENT

[PATENT DOCUMENT 1] Japanese Patent Application Publication No. 2009-303102

SUMMARY OF THE INVENTION

Problem to be Solved by the Invention

In order to perform a stable reception, it is necessary for a user to match the easy-to-receive-broadcasting-wave direction with the broadcasting wave arrival direction. But because the user does not know the antenna gain pattern or the broadcasting wave arrival direction, it is difficult to determine the best receiving direction.

In the patent document 1, a mobile communication terminal is disclosed which displays a message to a user on its screen notifying the user of a request for using an external antenna and how to position the antenna or an azimuth direction to a receivable area and the distance to the area. However, it is only that the message indicating a receivable area is displayed on the screen, so the user is unable to understand intuitively a direction in which the reception status of broadcasting waves should be improved.

It is an object of the present invention, in order to solve the above problems, to provide a mobile communication terminal that helps a user to direct the mobile communication terminal to a direction in which television broadcasting waves can be received the best.

Means for Solving the Problem

In order to solve the above problems and to achieve the object, a mobile communication terminal according to the present invention is a mobile communication terminal including an antenna for receiving broadcasting waves of television broadcasting and being capable of detecting its own current location and an azimuth direction and further including a broadcasting station location retaining unit configured to retain location information of a broadcasting station that transmits broadcasting waves, a best azimuth direction calculating unit configured to calculate, using the detected azimuth direction, the best azimuth direction in which the mobile communication terminal can receive the broadcasting waves the best, an azimuth direction displaying unit configured to display a location of the broadcasting station and the best azimuth direction in the detected current location, and an azimuth direction display updating unit configured to update as needed the display by the azimuth direction displaying unit in accordance with a change of the direction of the mobile communication terminal.

Effect of the Present Invention

According to the present invention, a mobile communication terminal can be provided which helps a user to adjust the direction of the mobile communication terminal to a direction in which television broadcasting waves can be received the best.

EMBODIMENTS FOR CARRYING OUT THE INVENTION

In the following, embodiments of the present invention will be described by referring to the accompanying drawings.
1. Overview
2. Hardware configuration
3. Functions
4. Calculation methods of the best azimuth direction
5. Process flow (1. Overview)

Figure 1:
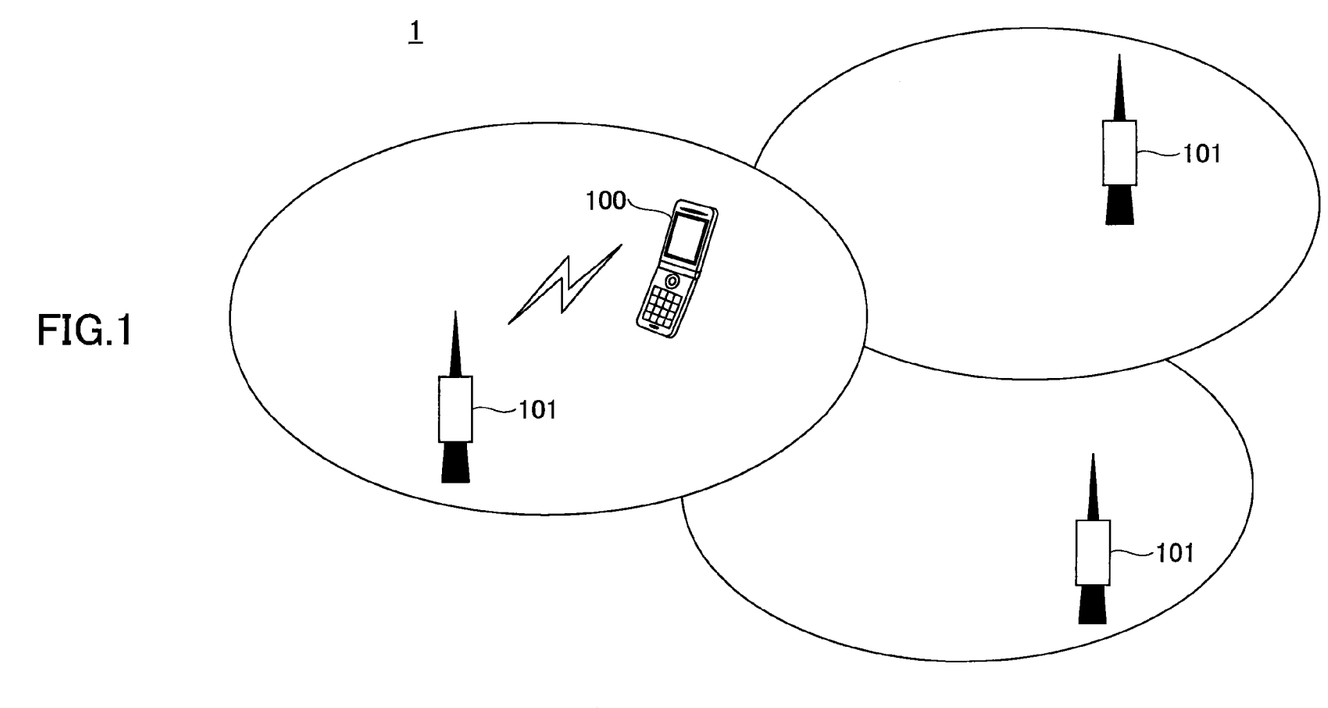
FIG. 1 is a drawing illustrating a system overview of a mobile communication terminal according to an embodiment of the present invention

FIG. 1 shows an overview of a system 1 of a mobile communication terminal according to an embodiment of the present invention. The system in FIG. 1 includes a mobile communication terminal 100 and a broadcasting station 101 that transmits broadcasting waves of television broadcasting, etc.

The mobile communication terminal 100 is a mobile communication terminal that is connected to a mobile communication network, and is capable of transmitting and receiving communication waves of mobile communications. Also, the mobile communication terminal 100 is capable of receiving broadcasting waves of television broadcasting, etc., broadcast from the broadcasting station 101 and is capable of playing video contents. Television broadcasting, etc., include a one segment partial reception service for mobile phones or mobile terminals, so-called "one-seg broadcasting", and multimedia broadcasting in which voice and data communications are used together with images. Furthermore, the mobile communication terminal 100 is capable of obtaining a location of the mobile communication terminal 100 by using a GPS sensor, and obtaining an azimuth direction in which the mobile communication terminal 100 is facing by using a geomagnetic sensor (an electronic compass). Here, the azimuth direction in which the mobile communication terminal 100 is facing is an azimuth direction in which the upper end of the mobile communication terminal 100 points in the case where a user holds the mobile communication terminal in his/her hand to operate it.

In general, a mobile communication terminal 100, which is capable of receiving television broadcasting, etc., includes a rod antenna for receiving broadcasting waves. Because a gain pattern of the antenna becomes a figure of eight, an easy-to-receive-broadcasting-wave direction and a not-easy-to-receive-broadcasting-wave direction are created. Also, it is known that, even with antennas other than a rod antenna, an easy-to-receive-broadcasting-wave direction and a not-easy-to-receive-broadcasting-wave direction are created because of an influence of a human body, etc. Therefore, in order to obtain a gain sufficient for receiving and playing broadcasts, it is necessary for a user of the mobile communication terminal 100 to adjust the direction of the mobile communication terminal 100.

Also, in order to receive broadcasting waves appropriately, it is necessary that not only a direction but also a way of holding the mobile communication terminal 100 by the user and a position of the antenna, etc., are appropriate.

A broadcasting station 101 transmits broadcasting waves of television broadcasting, etc. As shown in FIG. 1, one of the broadcasting stations 101 exists in each area. Locations of the broadcasting stations 101 and areas covered by the broadcasting stations 101 are given.

The mobile communication terminal 100 according to an embodiment of the present invention can support the direction adjustment of the mobile communication terminal 100 by the user by way of instructing the user to adjust the easy-to-receive-broadcast-wave direction of the mobile communication terminal to the azimuth direction of the broadcasting station 101. The user can adjust the direction intuitively while checking the easy-to-receive-broadcasting-wave direction in the current location of the mobile communication terminal 100 and the location of the broadcasting station 101 that are displayed on the mobile communication terminal 100. Furthermore, the mobile communication terminal 100 can support an appropriate way of holding the mobile communication terminal 100 and an appropriate setting of the antenna position.

(2. Hardware Configuration)

Figure 2:
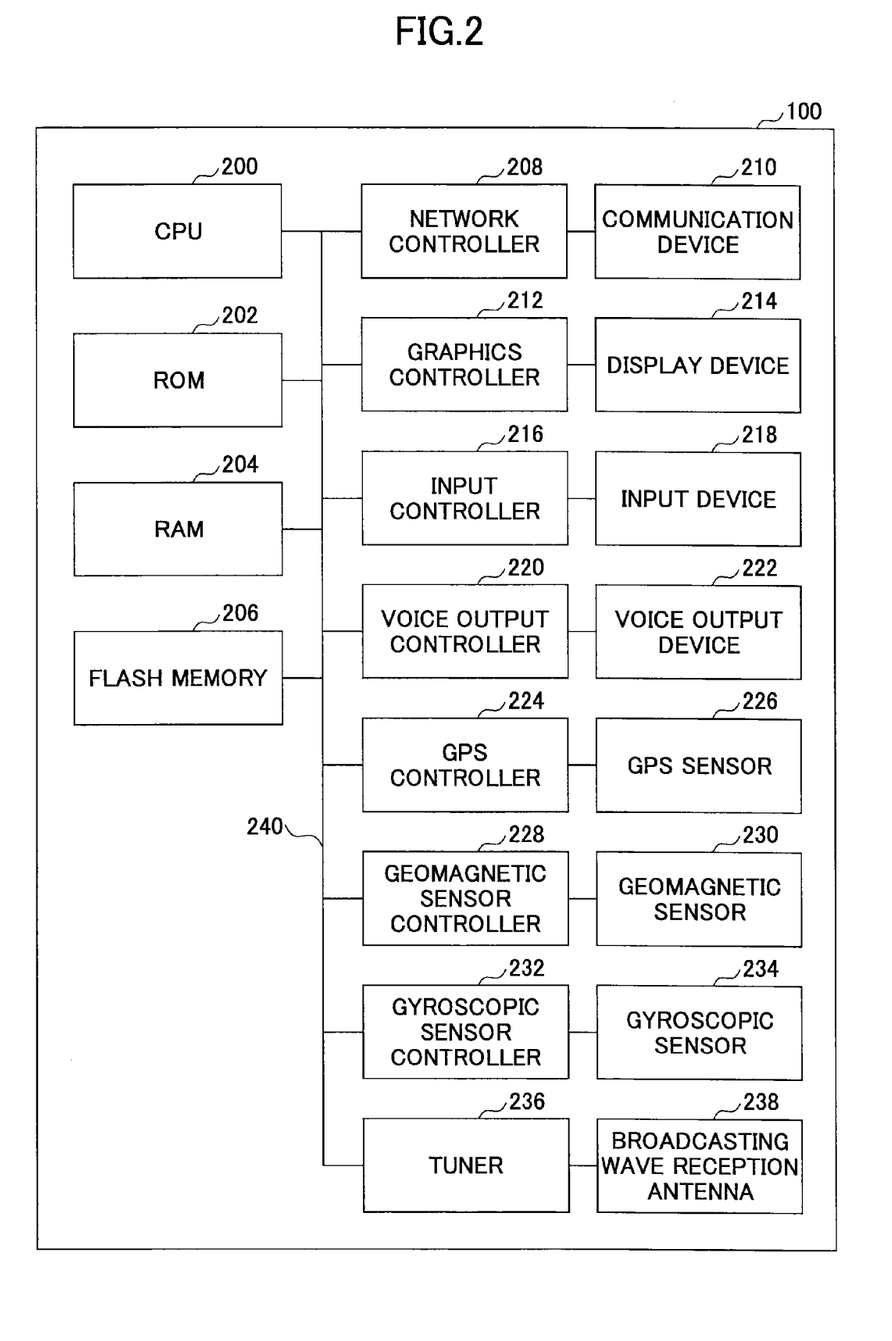
FIG. 2 is a drawing illustrating an example of a hardware configuration of a mobile communication terminal according to an embodiment of the present invention.

Using FIG. 2, an example of a hardware configuration of a mobile communication terminal 100 according to an embodiment of the present invention will be described.

The mobile communication terminal 100 in an embodiment of the present invention includes a CPU 200, a ROM 202, a RAM 204, a flash memory 206, a network controller 208, a communication device 210, a graphics controller 212, a display device 214, an input controller 216, an input device 218, a voice output controller 220, a voice output device 222, a GPS controller 224, a GPS sensor 226, a geomagnetic sensor controller 228, a geomagnetic sensor 230, a gyroscopic sensor controller 232, a gyroscopic sensor 234, a tuner 236, a broadcasting wave reception antenna 238 and a bus 240.

The CPU 200 performs operational control of a mobile communication program executed by the mobile communication terminal 100 in an embodiment of the present invention. The ROM 202 stores an OS, data, etc., needed for operations of the mobile communication program executed by the CPU 200. The RAM 204 constitutes a work area of the CPU 200, etc. The flash memory 206 stores locations of the broadcasting stations 101, broadcasting wave reception characteristics information of the mobile communication terminal 100, user data, etc. The broadcasting wave reception characteristics information includes an easy-to-receive-broadcasting-wave direction, information on how to hold the mobile communication terminal 100, and information on an appropriate position of the antenna. The network controller 208 performs communication control for communicating through the communication device 210 such as an antenna for mobile communications, etc. The graphics controller 212 performs control for displaying the screen for the user of the mobile communication terminal 100 through the display device 214 such as a liquid crystal display, etc. The input controller 216 controls signals inputted by the user through the input device 218 such as buttons, a touch screen, etc. The voice output controller 220 controls the voice output device 222 such as a speaker, etc., in order to output voice sounds. The GPS controller 224 controls the GPS sensor 226 in order to obtain location information of the mobile communication terminal 100. The geomagnetic sensor controller 228 controls the geomagnetic sensor 230 in order to obtain an azimuth direction of the mobile communication terminal 100. The gyroscopic sensor controller 232 controls the gyroscopic sensor 234 in order to obtain a change of an angle of the mobile communication terminal 100 by measuring angular velocities. The tuner 236 receives broadcasting waves through the broadcasting wave reception antenna 238. The bus 240 connects to each other the devices described above that constitute the mobile communication terminal 100 and performs the data exchange.

According to the above configuration, the user can adjust the direction of the mobile communication terminal 100 intuitively while checking the easy-to-receive-broadcasting-wave direction in the current location and the location of the broadcasting station 101 that are displayed on the screen.

Note that, although the gyroscopic sensor controller 232 and the gyroscopic sensor 234 are useful in the case where the guidance of the status of holding the terminal by hand is described three-dimensionally, in the case where it is described two-dimensionally, the gyroscopic sensor controller 232 and the gyroscopic sensor 234 may not be included. In this case, a change of the azimuth direction (angle) is obtained by an azimuth direction obtaining unit 318.

(3. Functions)

Figure 3:
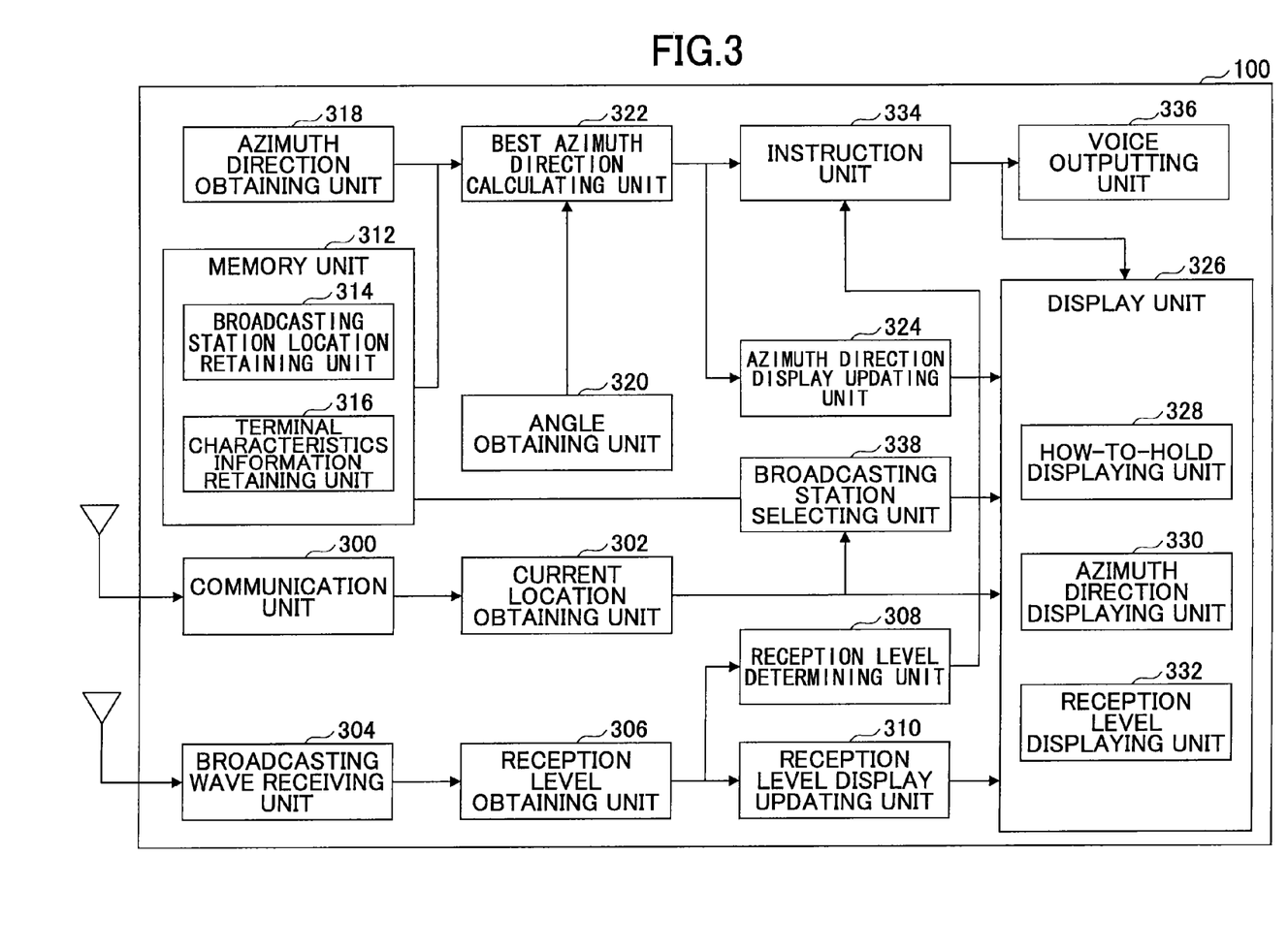
FIG. 3 is a drawing illustrating an example of functional blocks of a mobile communication terminal according to an embodiment of the present invention.

Using FIG. 3, an example of function blocks of the mobile communication terminal 100 will be described.

The mobile communication terminal 100 in an embodiment of the present invention includes a communication unit 300, a current location obtaining unit 302, a broadcasting wave receiving unit 304, a reception level obtaining unit 306, a reception level determining unit 308, a reception level display updating unit 310, a memory unit 312, broadcasting station location retaining unit 314, a terminal characteristics information retaining unit 316, the azimuth direction obtaining unit 318, an angle obtaining unit 320, a best azimuth direction calculating unit 322, an azimuth direction display updating unit 324, a display unit 326, a how-to-hold displaying unit 328, an azimuth direction displaying unit 330, a reception level displaying unit 332, an instruction unit 334, a voice outputting unit 336 and a broadcasting station selecting unit 338.

The communication unit 300 transmits and receives communication waves used for mobile communication systems or mobile communications such as a wireless LAN, etc. Also, the communication unit 300 receives signals from GPS satellites.

The current location obtaining unit 302 obtains the current location of the mobile communication terminal 100 based on the communication waves received by the communication unit 300 or signals from the GPS satellites. In order to obtain the current location by using communication waves, known technologies such as, for example, a location detection technology using the wireless LAN, a location detection technology using an ID of a base station that transmits communication waves in a mobile communication system, etc., can be used. Also, a known technology in which the current location is obtained based on signals from GPS satellites can be used. Obtained location information is expressed in, for example, two-dimensional or three-dimensional coordinates, and can identify the location relation with the broadcasting station 101.

The broadcasting wave receiving unit 304 receives broadcasting waves of television broadcasting, etc.

The reception level detecting unit 306 obtains a reception level of broadcasting waves received by the broadcasting wave receiving unit 304. The reception level is an index indicating reception quality of the broadcasting waves, and is divided into, for example, levels of 0 through 100 based on, for example, error rates of information received through broadcasting waves. In this case, 0 means the highest error rate, and 100 means the lowest error rate. The reception level is not limited to this example, but can be expressed by using any index indicating reception quality of broadcasting waves such as, for example, an error rate of signals, an SN ratio (Signal to Noise Ratio), a CN ratio (Carrier to Noise Ratio), etc.

The reception level determining unit 308 determines whether the reception level obtained by the reception level detecting unit 306 is equal to or greater than a predefined threshold value. The predefined threshold value indicates a reception level needed for restoring and playing the contents included in the broadcasting waves.

The reception level display updating unit 310 updates the reception level that changes as needed according to the location or the direction of the mobile communication terminal 100 and displays it on the reception level displaying unit 332.

The memory unit 312 includes the broadcasting station location retaining unit 314 and the terminal characteristics information retaining unit 316, and is used for storing data used by the mobile communication terminal 100.

The broadcasting station location retaining unit 314 retains location information indicating locations of the broadcasting stations 101. The location information is, for example, two-dimensional or three-dimensional coordinates that can identify the location of the broadcasting station 101 on a map. Also, together with the location information, information of the area covered by the broadcasting station is also retained. The area information is used for determining from which broadcasting station the mobile communication terminal 100 in its current location should receive the broadcasting waves.

The information retained in the broadcasting station location retaining unit 314 may be stored in advance, or may be received as necessary through the communication unit 300.

The terminal characteristics information retaining unit 316 retains information on a direction in which the mobile communication terminal 100 can receive broadcasting waves the most easily or on a direction in which the reception level becomes the highest. This directional information is expressed as, for example, a relative angle difference from the front direction of the mobile communication terminal 100. The directional information will be described in detail later. Also, the terminal characteristics information retaining unit 316 retains information on how to hold the mobile communication terminal 100 for a user in order to make the reception level of broadcasting waves the highest. The information is, for example, information indicating, together with the best position of the antenna, how the user should hold the mobile communication terminal 100 as shown in the "how-to-hold guidance" display area of the screen of the mobile communication terminal 100 illustrated in FIG. 6A. The information retained in the terminal characteristics information retaining unit 316 may be stored in advance, or may be received as necessary through the communication unit 300.

The azimuth direction obtaining unit 318 obtains the absolute azimuth direction in which the mobile communication terminal 100 is facing based on a geomagnetic vector (magnetic direction) of x, y axes or x, y, z axes obtained by the geomagnetic sensor 230. The method of calculating the azimuth direction from the geomagnetic vector varies with the geomagnetic sensor 230, and is executed using known technologies.

The angle obtaining unit 320 obtains a change of the angle of the mobile communication terminal 100 based on angular velocities obtained from the gyroscopic sensor 234.

The best azimuth direction calculating unit 322 calculates the best azimuth direction in which the reception level of the mobile communication terminal 100 becomes the highest based on the direction in which the reception level of broadcasting waves becomes the highest, retained in the terminal characteristics information retaining unit 316, and the azimuth direction obtained by the azimuth direction obtaining unit 318. Note that the calculating method of the best azimuth direction will be described later. The best azimuth direction changes as needed according to the current direction of the mobile communication terminal 100. At this point, by using together information of a change of an angle obtained by the angle obtaining unit 320, a more accurate azimuth direction can be obtained.

The azimuth direction display updating unit 324 updates and displays the best azimuth direction on the azimuth direction displaying unit 330 obtained as needed by the best azimuth direction calculating unit 322.

Figure 6A:
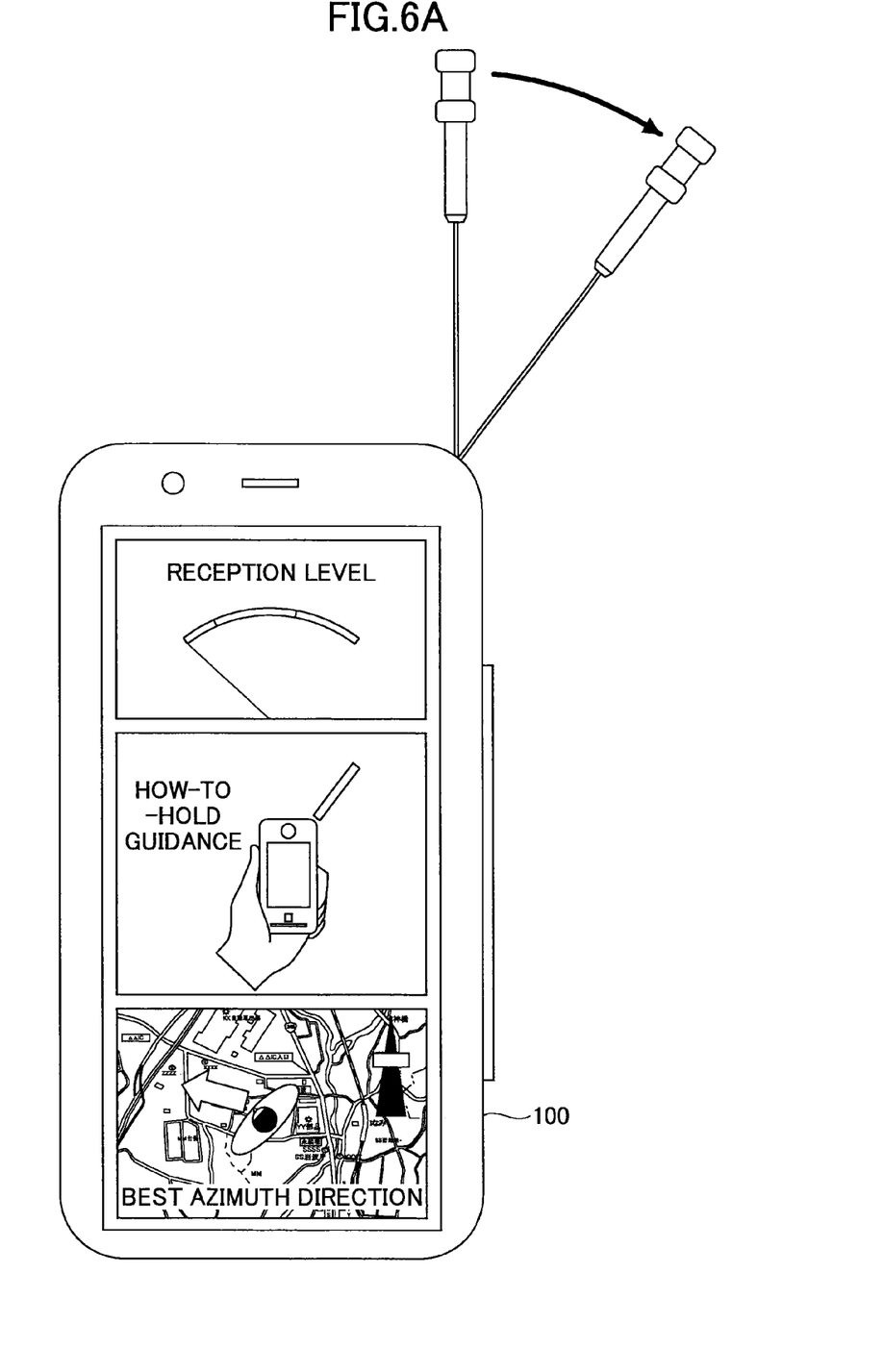
FIG. 6A is a drawing illustrating a display example of a mobile communication terminal according to an embodiment of the present invention.
Figure 6B:
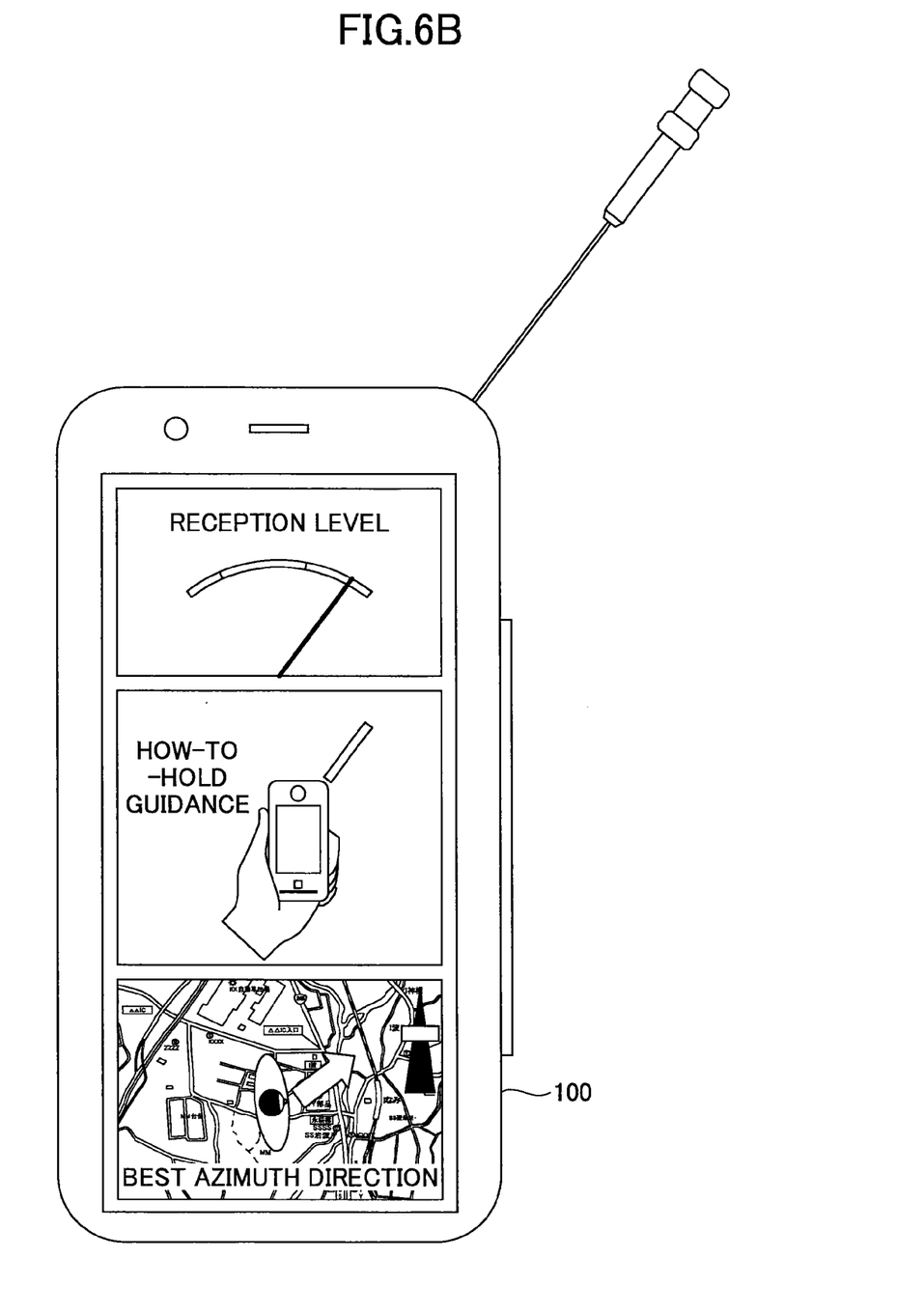
FIG. 6B is a drawing illustrating a display example of a mobile communication terminal according to an embodiment of the present invention.

The display unit 326 includes the how-to-hold displaying unit 328, the azimuth direction displaying unit 330 and the reception level displaying unit 332, and displays on the display device 214 the information to prompt the user to adjust the direction of the mobile communication terminal so that the reception level of broadcasting waves will improve. Display examples are shown in FIGS. 6A and 6B. The display examples will be described in detail later.

The how-to-hold displaying unit 328 displays on the display device 214 the information of how to hold the mobile communication terminal 100 by the user, retained by the terminal characteristics information retaining unit 316. Display examples are shown in FIGS. 6A and 6B. In FIGS. 6A and 6B, the mobile communication terminal 100 is expressed by a mark illustrating a man looked down upon from above as a user in a state of holding the mobile communication terminal in his hand. The display examples will be described in detail later.

The azimuth direction displaying unit 330 displays on the screen the best azimuth direction obtained through the azimuth direction display updating unit 324 together with the current location of the mobile communication terminal 100 and the location of the broadcasting station 101. For example, the best azimuth direction is displayed by an arrow, the mobile communication terminal 100 is displayed by a mark illustrating the user, and the broadcasting station 101 is displayed by a mark illustrating a broadcasting tower. Each arrow or mark may be displayed on a map indicating the location of the mobile communication terminal 100 or the broadcasting station 101. Display examples are shown in FIGS. 6A and 6B. The display examples will be described in detail later.

The reception level displaying unit 332 displays on the screen the reception level obtained through the reception level display updating unit 310. The reception level can be displayed using, for example, a fan-shaped indicator, indicating low reception level at the left end and high reception level at the right end. However, the displaying method of the reception level is not particularly limited to this example. Also, the reception level of a predefined number of levels may be displayed in a fewer number of levels in more abstracted way. Display examples are shown in FIGS. 6A and 6B. The display examples will be described in detail later.

The instruction unit 334 instructs the user to change the direction of the terminal through the display unit 326 or the voice outputting unit 336 in the case where the reception level is determined to be lower than a threshold value by the reception level determining unit 308. At this point, the instruction unit 334 instructs the user to match the best azimuth direction of the mobile communication terminal 100 in the current location with the azimuth direction of the broadcasting station 101. The instruction is presented as a text message displayed on the display device 214 or as a voice message played through the voice outputting device 222.

The voice outputting unit 336, receiving an instruction from the instruction unit 334, outputs a voice message to the user. The voice message may be a fixed phrase recorded in advance or may be synthesized and outputted appropriately.

The broadcasting station selecting unit 338 selects a broadcasting station 101 that covers the area in which the current location obtained by the current location obtaining unit 302 is included. The display and the instruction for the user are presented so that the reception level of the mobile communication terminal 100 for the broadcasting waves transmitted by the broadcasting station selected here becomes the best.

In this way, the mobile communication terminal 100 according to an embodiment of the present invention calculates the best azimuth direction in which the reception level of the broadcasting waves in the mobile communication terminal becomes the best, and instructs the user to make the best azimuth direction at the current location point toward the location of the broadcasting station 101. As a result, without knowing the reception characteristics of the broadcasting waves of the mobile communication terminal 100 the user uses and the arrival direction of the broadcasting waves, the user can make the mobile communication terminal 100 face in the best direction for receiving the broadcasting waves.

Note that the angle obtaining unit 320 is an optional configuration element. Even in the case where the angle obtaining unit 320 is not included, the azimuth direction obtained by the azimuth direction obtaining unit 318 can be used for calculating the best azimuth direction.

(4. Calculation Methods of the Best Azimuth Direction)

Figure 4A:
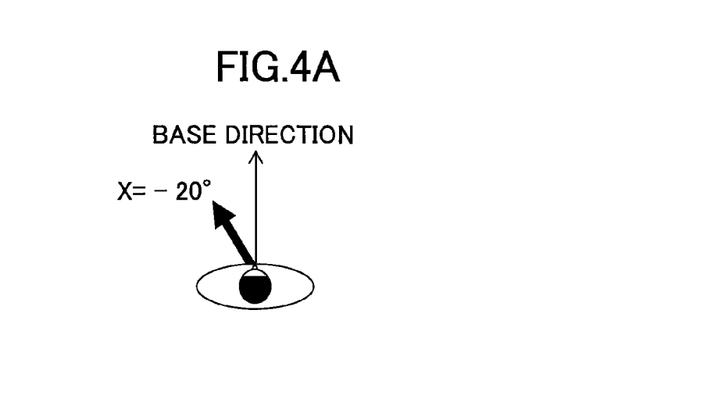
FIG. 4A is a drawing illustrating a best azimuth direction determining method of a mobile communication terminal according to an embodiment of the present invention.
Figure 4B:
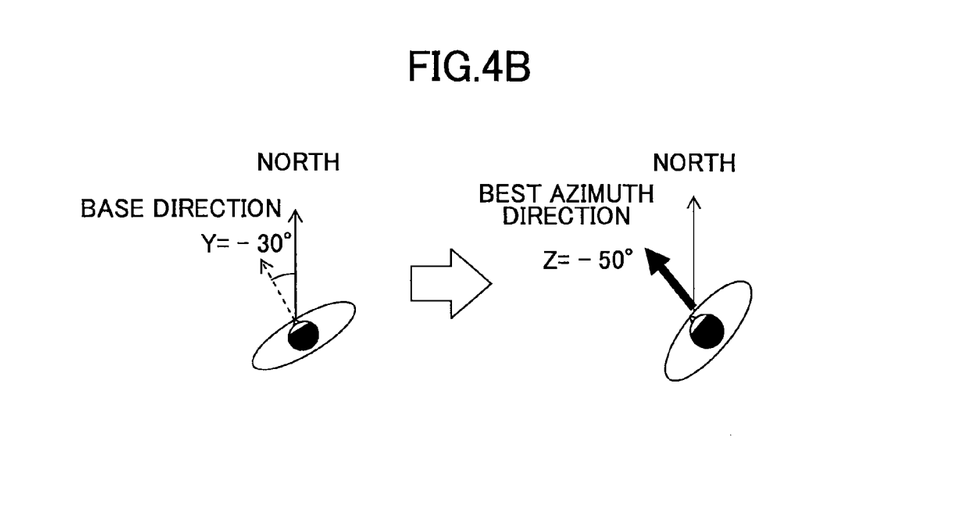
FIG. 4B is a drawing illustrating a best azimuth direction determining method of a mobile communication terminal according to an embodiment of the present invention.
Figure 4C:
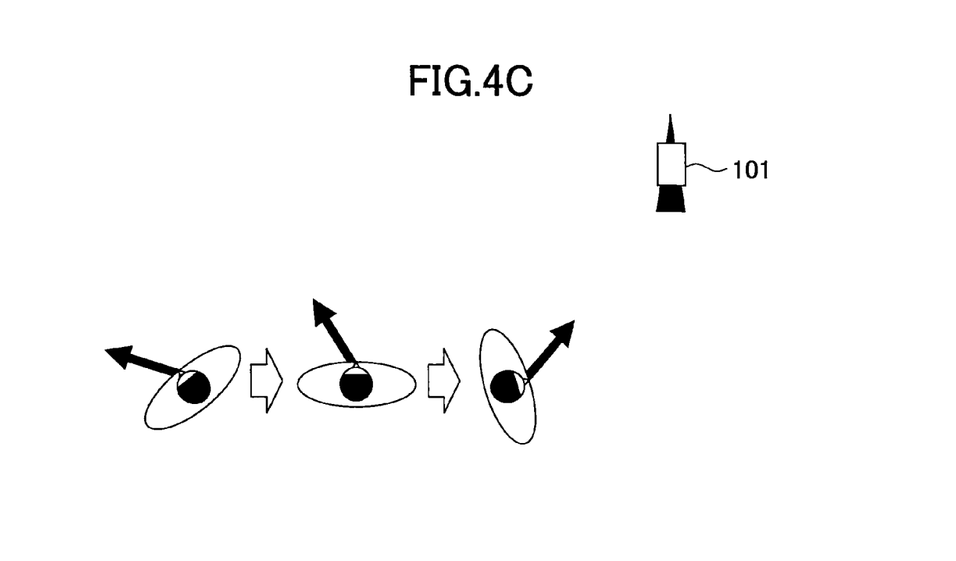
FIG. 4C is a drawing illustrating a best azimuth direction determining method of a mobile communication terminal according to an embodiment of the present invention.

Using FIGS. 4A through 4C, a calculation method of the best azimuth direction by the best azimuth direction calculating unit 322 will be described with specific examples. In FIGS. 4A through 4C, the mobile communication terminal 100 is expressed by a mark as a user holding the mobile communication terminal 100 in his/her hand. This mark illustrates the shape of a man looked down upon from above his head. And it is assumed that the front direction in which the man faces is the base direction.

First, FIG. 4A illustrates a method for obtaining the angle X in advance in which the reception level of the mobile communication terminal 100 becomes the highest, or the antenna gain becomes the biggest. The X is obtained by assuming the clockwise direction from the base direction as the plus direction. In an example of FIG. 4A, the X is minus 20 degrees. This angle X is retained in the terminal characteristics information retaining unit 316 as information of the direction in which the reception level of the broadcasting waves of the mobile communication terminal 100 becomes the highest.

FIG. 4B illustrates a method for calculating the best azimuth direction in the mobile communication terminal 100. When the actual azimuth direction is obtained by the azimuth direction obtaining unit 318, the difference angle Y between the base direction and the direction pointing to the north, assuming the clockwise direction as the plus direction, is obtained. In an example of FIG. 4B, the Y is minus 30 degrees. The best azimuth direction Z can be obtained by X+Y.

FIG. 4C illustrates an example by a diagram in which in order to match the best azimuth direction obtained and displayed with the azimuth direction of the broadcasting station 101 from the current location, the user has changed the direction of the mobile communication terminal 100 over three stages. When the azimuth direction in which the mobile communication terminal is facing changes, the best azimuth direction is recalculated because the value of the above Y changes. And, based on the best azimuth direction that is recalculated and redisplayed, the user further adjusts the direction of the mobile communication terminal 100.

In this way, using the angle X that is given in advance and the Y that is obtained, the best azimuth direction is calculated. Then, the best azimuth direction is updated as needed in accordance with the changing value of the Y.

(5. Process Flow)

Figure 5:
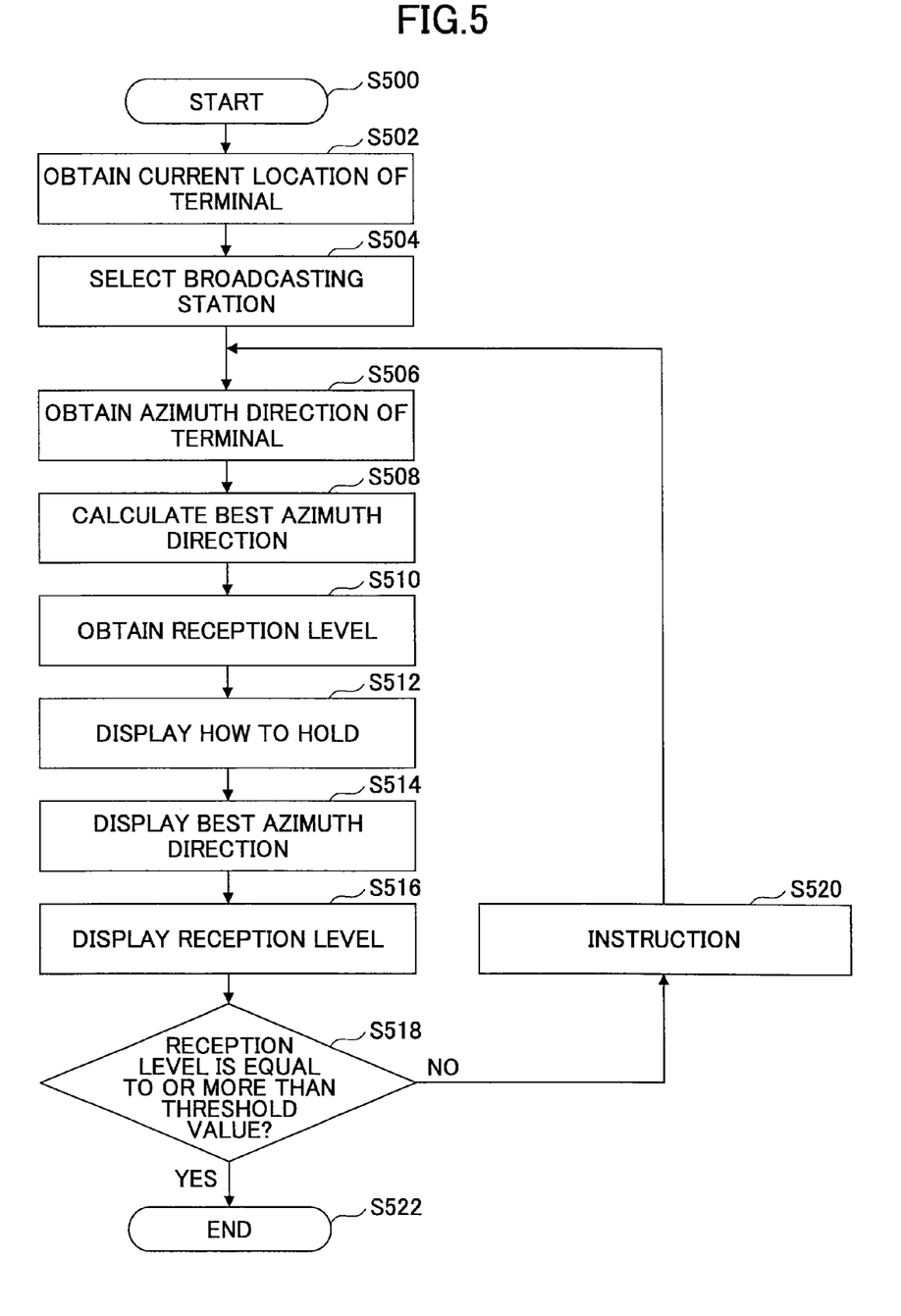
FIG. 5 is a drawing illustrating a process flow of a mobile communication terminal according to an embodiment of the present invention.

Using FIGS. 5, 6A, and 6B, an example of a process flow of the mobile communication terminal 100 will be described. FIG. 5 shows a process flow of the mobile communication terminal 100, and FIGS. 6A and 6B shows the display screen of the mobile communication terminal 100. The display screen in FIGS. 6A and 6B is divided into three display areas, which indicate, from the top, a "reception level" display area, a "how-to-hold guidance" display area and a "the best azimuth direction" display area.

From step S500, the process of the mobile communication terminal 100 starts.

In step S502, the current location obtaining unit 302 obtains the current location of the mobile communication terminal 100.

In step S504, the broadcasting station selecting unit 338 selects a broadcasting station 101 that corresponds to the current location. Thereafter, the direction of the mobile communication terminal is adjusted so that the best reception level can be obtained for the broadcasting waves transmitted by the selected broadcasting station 101.

In step S506, the azimuth direction obtaining unit 318 obtains the azimuth direction of the mobile communication terminal 100.

In step S508, the best azimuth direction calculating unit 322 calculates the best azimuth direction. The calculation method is as described above.

in step S510, the reception level obtaining unit 306 obtains the reception level of the broadcasting waves.

In step S512, the how-to-hold displaying unit 328 displays information of how to hold the mobile communication terminal by the user that is retained by the terminal characteristics information retaining unit 316. Display examples are shown in the "how-to-hold guidance" display areas of FIGS. 6A and 6B. In this way, the display includes information of the positions of fingers when the user holds the mobile communication terminal in his/her hand, and the direction of the rod antenna.

In step S514, the azimuth direction displaying unit 330 displays on the screen the best azimuth direction calculated by the best azimuth direction calculating unit 322, together with the current location of the mobile communication terminal and the location of the broadcasting station 101. Display examples are shown in the "the best azimuth direction" display areas of FIGS. 6A and 6B. In these examples, the front direction of the user and the best azimuth direction are shown, and the locations of the mobile communication terminal 100 and the broadcasting station 101 are shown together on a map.

In step S516, the reception level displaying unit 332 displays the obtained reception level on the screen. Display examples are shown in the "reception level" display areas of FIGS. 6A and 6B. In these examples, the reception level is displayed using, for example, a fan-shaped indicator indicating low reception level at the left end and high reception level at the right end.

In step S518, it is determined by the reception level determining unit 308 whether the reception level is equal to or greater than the threshold value. If the reception level is equal to or greater than the threshold value, then the process moves to step S522, and if the reception level is less than the threshold value, then it moves to step S520.

In step S520, the instruction unit 334 instructs the user to change the direction of the mobile communication terminal 100 so that the best azimuth direction points to the broadcasting station 101. In this case, a voice message to instruct the changing of the direction may be outputted through a speaker, or a text message may be displayed on the screen. The message may be a specific message instructing the user to change the direction to which direction and to what extent, or it may be a message simply prompting the user to change the direction so that the arrow in the "best azimuth direction" display area becomes pointing to the broadcasting station 101.

After step S520, in step S506, the current location and the azimuth direction of the terminal are obtained again. After this, the best azimuth direction and the reception level are obtained again in a similar way, and the display contents are updated. FIG. 6B illustrates that the reception level is improved as the result of the user setting an antenna in the right position and changing the direction of the mobile communication terminal according to the display contents of FIG. 6A.

In step S522, the process ends.

According to the description above, the user, while checking on the screen the best azimuth direction and the broadcasting station 101 location updated every time the direction of the terminal is changed, can intuitively direct the mobile communication terminal 100 to pointing the direction in which the best reception level is obtained. At this point, by also displaying the reception level, it can be checked whether the direction is properly being adjusted. Furthermore, by displaying both the way to hold the terminal and the way to position the antenna so that the reception level becomes the best, even a user who is not used to viewing the television broadcasting, etc., in his/her daily life, can obtain the best reception level.

Note that the sequence of steps S508 and S510 is arbitrary.

Also, the sequence of steps S512, S514 and S516 is arbitrary.

Also, the instruction in step S520 can be omitted according to the skillfulness of the user. That is, without getting an instruction to match the best azimuth direction with the broadcasting station 101 direction, only by checking the "best azimuth direction" display area, the user can match the direction of the mobile communication terminal with the direction in which the best reception level is obtained.

Also, after step S520, by moving to step S502, the current location of the mobile communication terminal 100 may be obtained again. By this, in the case where the mobile communication terminal has moved, it becomes possible to adjust the direction of the mobile communication terminal 100 in order to obtain the best reception level for the broadcasting waves that are transmitted by a broadcasting station corresponding to the area in which the terminal has moved.

Note that the above processes of step S500 through S522 can be implemented by a computer executing processes as a mobile communication program. The mobile communication program may be provided in such a way that the program is stored in a memory medium such as, for example, a flexible disk, a CD-ROM, a memory card, etc.

A mobile communication terminal, a mobile communication method, a mobile communication program and a memory medium are described above referring to the present embodiments, but the present invention is not limited to the embodiments above, as various modifications and improvements are available within the scope of the present invention. The present embodiments are described using specific numbers in order to facilitate understanding of the invention, but these numbers are used just as an example and, unless otherwise noted, any appropriate number can be used. Borders of function units or processing units in functional block diagrams do not necessarily correspond to borders of physical components. Operations of multiple function units may be performed in one physical component, or operations of one function unit may be performed by multiple physical components. For the sake of convenience, devices of the present embodiments are described using a functional block diagram, but those devices may be realized as a hardware, software, or a combination of both. The software may be provided in a Random Access Memory (RAM), a Flash memory, a Read-Only Memory (ROM), an EPROM, an EEPROM, a register, a hard disk (HDD), a removable disk, a CD-ROM, a database, a server, or any other memory media.

The present application is based on and claims the benefit of priority of Japanese Priority Application No. 2011-256421 filed on Nov. 24, 2011 the entire contents of which are hereby incorporated by reference.

DESCRIPTION OF THE REFERENCE NUMERALS

100 Mobile communication terminal
300 Communication unit
302 Current location obtaining unit
304 Broadcasting wave receiving unit
306 Reception level obtaining unit 308 Reception level determining unit
310 Reception level display updating unit
312 Memory unit
314 Broadcasting station location retaining unit
316 Terminal characteristics information retaining unit
318 Azimuth direction obtaining unit
320 Angle obtaining unit
322 Best azimuth direction calculating unit
324 Azimuth direction display updating unit
326 Display unit
328 How-to-hold displaying unit
330 Azimuth direction displaying unit
332 Reception level displaying unit
334 Instruction unit
336 Voice outputting unit
338 Broadcasting station selecting unit

The invention claimed is:

1. A mobile communication terminal including an antenna for receiving broadcasting waves of television broadcasting and being capable of detecting its own current location and an azimuth direction, the mobile communication terminal comprising:
   circuitry configured to
      retain location information of a broadcasting station that transmits the broadcasting waves;
      calculate, using the detected azimuth direction, a best azimuth direction in which the mobile communication terminal can receive the broadcasting waves the best; and
   a display configured to display the location of the broadcasting station and the best azimuth direction in the detected current location, wherein
   the circuitry is configured to control the display to update, as needed, the displayed best azimuth direction in accordance with a change of the azimuth direction of the mobile communication terminal; and
   the display is configured to display, simultaneously with the location of the broadcasting station and the best azimuth direction in the detected current location, guidance on how to hold the mobile communication terminal and a way to position the antenna so that a reception status of the broadcasting waves becomes the best.

2. The mobile communication terminal as claimed in claim 1, wherein
   the display is configured to display a reception level of the broadcasting waves, and
   the circuitry is configured to control outputting an instruction to a user to match the displayed best azimuth direction with a direction from the current location to the location of the broadcasting station, wherein the instruction to the user is output in the case where the reception level is less than a predefined threshold value.

3. The mobile communication terminal as claimed in claim 2, wherein:
   the display is configured to display the reception level simultaneously with the location of the broadcasting station and the best azimuth direction in the detected current location; and
   the circuitry is configured to control the display to update the displayed reception level in accordance with a change of the reception level.

4. The mobile communication terminal as claimed in claim 1, wherein the location of the broadcasting station and the best azimuth direction in the detected current location are displayed on a map.

5. A mobile communication method to be implemented by a mobile communication terminal including an antenna for receiving broadcasting waves of television broadcasting and being capable of detecting its own current location and an azimuth direction, the mobile communication method comprising:
   a best azimuth direction calculating step of, using the detected azimuth direction, calculating a best azimuth direction in which the mobile communication terminal can receive the broadcasting waves the best;
   an azimuth direction displaying step of displaying a pre-retained location of a broadcasting station that transmits the broadcasting waves and of the best azimuth direction in the detected current location;
   an azimuth direction display updating step of updating the display as needed in accordance with a change of the azimuth direction of the mobile communication terminal; and
   a how-to-hold displaying step of displaying, simultaneously with the displaying in the azimuth direction displaying step, guidance on how to hold the mobile communication terminal and a way to position the antenna so that a reception status of the broadcasting waves becomes the best.

6. A computer-readable non-transitory recording medium having a mobile communication program to be implemented by a mobile communication terminal including an antenna for receiving broadcasting waves of television broadcasting and being capable of detecting its own location and an azimuth direction embodied therein causing a computer to execute:
   a best azimuth direction calculating step of, using the detected azimuth direction, calculating a best azimuth direction in which the mobile communication terminal can receive the broadcasting waves the best;
   an azimuth direction displaying step of displaying a pre-retained locating of a broadcasting station that transmits the broadcasting waves and of the best azimuth direction in the detected current location;
   an azimuth direction display updating step of updating the display as needed in accordance with a change of the azimuth direction of the mobile communication terminal; and
   a how-to-hold displaying step of displaying, simultaneously with the displaying in the azimuth direction displaying step, guidance on how to hold the mobile communication terminal and a way to position the antenna so that a reception status of the broadcasting waves becomes the best.

* * * * *